Jan. 26, 1971 E. H. GRAY 3,558,588

EXOTHERMIC PROCESS CONTROL

Filed March 5, 1969

INVENTOR
E. H. GRAY

BY
Young & Quigg

ATTORNEYS

__United States Patent Office__

3,558,588
Patented Jan. 26, 1971

3,558,588
EXOTHERMIC PROCESS CONTROL
Earl H. Gray, Bartlesville, Okla., assignor to Phillips
Petroleum Company, a corporation of Delaware
Continuation-in-part of application Ser. No. 452,533,
May 3, 1965. This application Mar. 5, 1969, Ser.
No. 814,873
Int. Cl. C08d 1/14, 1/18; B08d 3/08
U.S. Cl. 260—94.2                                      4 Claims

ABSTRACT OF THE DISCLOSURE

A multi-stage exothermic process, such as the polymerization of butadiene, is controlled by adjusting the heat removal from each stage in response to temperature measurements of materials in the individual reactors. The catalyst addition to the first reactor is regulated in response to the heat removal from a downstream stage.

This application is a continuation-in-part of application Ser. No. 452,533, filed May 3, 1965.

Multi-stage catalytic processes to obtain a desired conversion in each stage and a desired total conversion for the multi-stages are difficult to control. This is particularly true of continuous exothermic processes conducted in a plurality of reactors operated in series. In such a process, incremental or distinct conversions of reactant or feed to the product occur in each of the reactors as the reaction mixture is passed from one reactor to another.

Many of the procedures hereinbefore employed have been found unsatisfactory in providing effective control over conversions carried out in a series of reactors. For example, in the polymerization of butadiene to produce cis-1,4-polybutadiene, wherein the exothermic polymerization reaction is carried out in two or more reactors, there is a need for an effective procedure and means for controlling reaction temperature and effecting a maximum total conversion of the reactant feed material to polymer product and the distribution of this conversion among the reactors. The polymerization, wherein a catalyst system such as a trialkyl aluminum, titanium tetrachloride and either iodine or an iodine compound is employed, is exothermic. Because of the heat transfer limitations of the individual reactors, a sufficient portion of the total conversion must take place in the first reactor or it will become impossible to control the temperature in the second reactor. Excessive conversion in the second reactor will force the temperature to an undesirably high level which may exceed the heat transfer capabilities of the second reactor and thus prevent control of temperature in the second reactor at a desired low value. Conversion in the first reactor can be increased by increasing the trialkyl aluminum catalyst component level (an excess is normally employed in the reaction zone to neutralize poisons in the reactant and solvent feeds) within the first reactor, but this increase of the trialkyl aluminum catalyst component concentration in the first reactor does not produce a significant increase in the total conversion achieved by the two reactors.

Accordingly, an object of my invention is to provide an improved method and apparatus for controlling a multi-stage exothermic process.

Another object of my invention is to provide a method and apparatus for controlling a multi-stage exothermic process wherein no more than a set maximum value of heat is generated in a downstream reaction stage.

Other objects, advantages and features of my invention will be readily apparent to those skilled in the art from the following description, the drawing and appended claims.

By my invention, I have provided a multi-stage exothermic process control system wherein the temperature in a downstream exothermic process stage is measured and the removal of heat from the downstream stage is manipulated in response thereto so as to maintain the measured temperature substantially constant. In addition, a process variable of an upstream exothermic stage is manipulated in response to the removal of heat in the downstream stage so as to maintain desired heat removal from the downstream exothermic stage. This invention is particularly applicable to the control of production of cis-1,4-polybutadiene.

Reference will now be made to the accompanying drawing and initially to FIG. 1, where a process for the exothermic catalytic polymerization of butadiene to cis-1,4-polybutadiene is illustrated together with the novel features of my invention. The polymerization of butadiene to cis-1,4-polybutadiene is known in the art and reference is made to the prior art such as U.S. Pat. No. 3,178,402 for a fuller description thereof.

Figure 1:
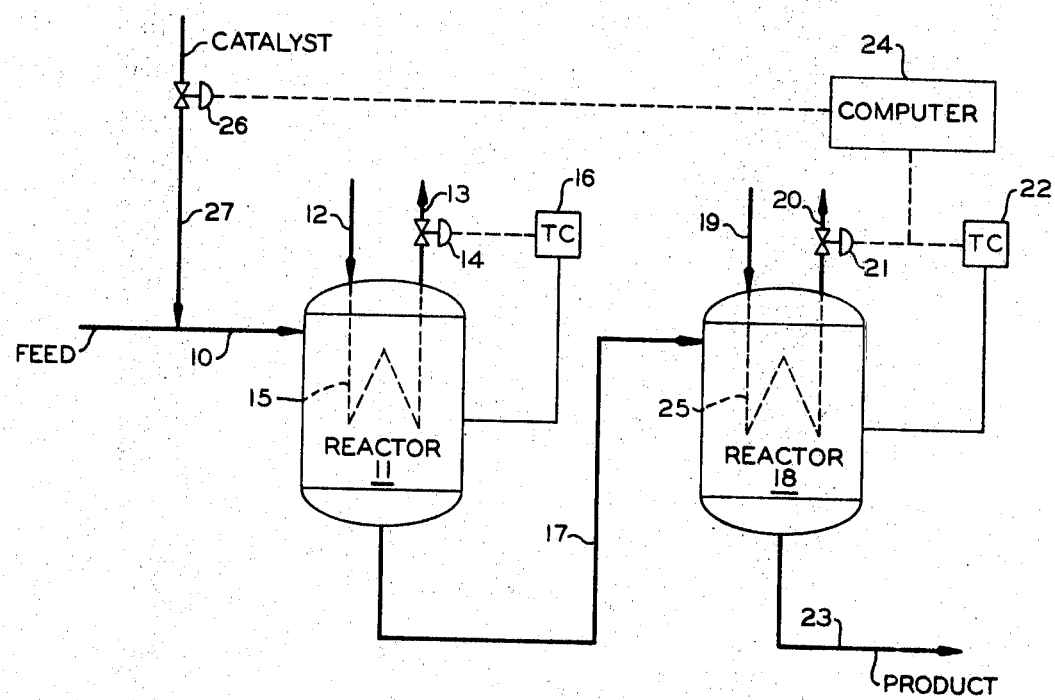
FIG. 1 is a schematic representation of one embodiment of my invention.

In FIG. 1, reactors 11 and 18 are connected in series by conduit 17. Although two reactors are illustrated, it is within the scope of the invention to employ additional reactors with the number of reactors employed depending upon the optimum size of the reactors, desired residence time, and design capacity of the polymerization plant.

As illustrated, a feed mixture comprising butadiene monomer, hereinafter described polymerization catalyst components, and toluene is introduced through conduit 10 to reactor 11. A trialkyl aluminum catalyst component, such as triisobutyl aluminum which acts to maintain the activity of the polymerization catalyst, can be passed as a solution in toluene to conduit 10 through conduit 27. The rate of flow of the solution of the triisobutylaluminum through conduit 27 is controlled by a valve 26 which is manipulated in response to a signal hereinafter described. Titanium tetrachloride polymerization catalyst component in a toluene solution containing iodine is introduced into reactor 11 through condut 10 wth the butadene monomer. The titanium tetrachloride and iodine are partially admixed in toluene just prior to admixture with the other reactor feed components introduced into reactor 11. The resulting feed mixture, precooled by means not illustrated, and containing the catalyst is then introduced into reactor 11 by conduit 10.

The polymerization reaction proceeds as the reaction mixture is passed through reactor 11, transfer conduit 17 and reactor 18, the butadiene being incrementally converted to polymer in each of the reactors. Reactors 11 and 18 are equipped with suitable heat exchange means such as cooling coils 15 and 25, respectively, and/or jackets and agitation means not illustrated. A coolant such as liquid ammonia is supplied to each of cooling coils 15 and 25 through conduits 12 and 19, respectively. A partially vaporized coolant is withdrawn from cooling coil 15 by conduit means 13 and from cooling coil 25 by conduit means 20. The ammonia cools the reaction materials by vaporizing within coils 15 and 25, the temperature of vaporization being determined by the pressure within the coils.

Heat removal from reactor 11 and reactor 18 is controlled by opening and closing valves 14 and 21 in conduits 13 and 20, respectively. Maximum vaporization of ammonia and maximum heat transfer is effected within reactors 11 and 18 by maintaining valves 14 and 21 in the open position.

The temperature of the reaction mixture in reactor 11 is sensed by conventional temperature measuring and transmitting means, and a signal representative of the measured temperature is transmitted to a conventional temperature controller 16. Responsive to the signal received from the temperature sensing means and to a set point representative of a desired reaction temperature, temperature controller 16 manipulates the position of valve 14 so as to maintain a desired heat removal from and thereby a desired temperature within reactor 11. For example, if the measured temperature should tend to increase above the set point value, valve 14 is moved toward a more open position. If the measured temperature should tend to decrease, valve 14 is moved toward a more closed position.

The reaction effluent containing cis-1,4-polybutadiene is withdrawn from reactor 18 through conduit 23. It is frequently desirable to inject one or more additives to aid in the control of polymerization and/or to improve the polymer product withdrawn through conduit 23. For example, it is often desirable that the polymerization cease after the effluent is withdrawn from reactor 18, and for this purpose a shortstop or catalyst inactivating agent, such as rosin acid, can be added to the effluent stream by a means not herein illustrated. Another additive frequently injected at this point is an antioxidant which can also be added to the effluent stream.

The temperature of the reaction mixture within reactor 18 is sensed by a conventional temperature measuring and transmitting means, and a signal representative of the measured temperature is transmitted to a conventional temperature controller 22. Responsive to a set point representative of a desired temperature within reactor 18 and the temperature measurement within reactor 18, temperature controller 22 manipulates valve 21 so as to maintain a desired reaction temperature within reactor 18. This control takes place in the same manner as controller 16 regulates the temperature in reactor 11.

Figure 2:
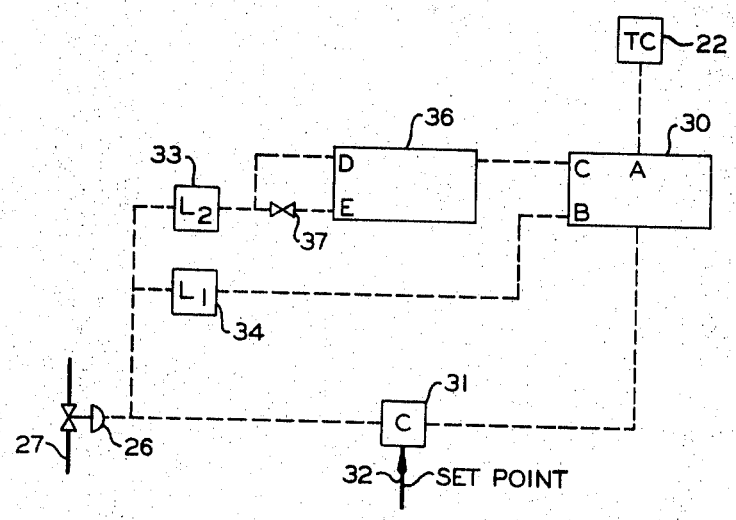
FIG. 2 is a schematic representation of computer 24 of FIG. 1.

The signal applied to control valve 21, which is representative of the position of valve 21 and thereby the heat removal from reactor 18, is passed as illustrated from temperature controller 22 to computer 24. Referring to FIG. 2, the operation of computer 24 will hereinafter be described.

In a feedback control system, a manipulatable variable of the process is adjusted in response to a measured value. If, for example, the rate of flow of triisobutylaluminum to reactor 11 is adjusted in response to the position of valve 21, the effectiveness of the control system is dependent upon the characteristics of the process. The characteristics of the process are manifested by a change in the position of valve 21 which ultimately results from a change in the rate of flow of triisobutylaluminum to reactor 11 while maintaining a desired temperature within reactor 18. A change in the rate of flow of triisobutylaluminum will produce a change in the position of value 21, but such change in valve position will not become apparent until a period of time has elapsed. This period of time, known to be a combination of dead time and process lag, is detrimental to the performance of the process control system because of excessive phase shift. It is possible to compensate the control system so that the effect of this characteristic phase shift of a reaction process is minimized. This type of control is generally referred to as compensated control.

The compensating circuit of FIG. 2 provides a means for manipulating the flow of triisobutylaluminum to reactor 11 while maintaining desired reaction temperatures within reactors 11 and 18, desired heat removal from reactor 18, and a maximum total conversion to the reaction product as evidenced by maximum heat removal from reactor 18. The term "maximum heat transfer" as hereinafter employed, refers to the heat removal from the reacting solution through the cooling coil walls into the ammonia that can be effected while maintaining a desired temperature within reactor 18. As related to the position of valve 21, "maximum heat transfer" is measured by the maximum open position permissible and consistent with the maintenance of a desired reaction temperature within reactor 18.

The signal transmitted from temperature controller 22, which regulates and is thereby representative of the position of valve 21, is applied within computer 24 to a computing relay 30 which is capable of solving the following equation: Output=$g(A-C)+B$, where A, B and C are input variables and $g$ is the adjustable gain of computing relay 30. A conventional pneumatic computing relay which is capable of solving the above equation is the Foxboro M58-1 computing relay illustrated in Bulletin 13-19 or a Foxboro M57-1 computing relay illustrated in Bulletin 37-57A, and distributed by The Foxboro Co., Foxboro, Mass.

An output signal is transmitted from computing relay 30 to a conventional controller 31 which is capable of comparing this signal with a set point 32 and transmitting a signal to thus open or close valve 26. Controller 31 also transmits its output signal to a lag means such as a pneumatic signal lag means 33 and 34 having lags $L_2$ and $L_1$, respectively.

When operating to effect a desired heat transfer in reactor 18, a value for set point 32 representative of the maximum permissible valve opening that will permit effective temperature control within reactor 18 is applied. Normally, set point signal 32 will be the same as the signal to valve 21 when valve 21 is approximately 90 percent opened. This permits control to be exercised in both directions while still utilizing nearly all of the cooling capacity of the final reactor.

In response to the output signal from controller 31, lag means 33 transmits a pneumatic signal to pneumatic computing means 36 as an input variable D. Computing means 36 also receives a pneumatic signal as an input variable E, said pneumatic signal being transmitted from lag means 33 through restriction means 37. Pneumatic computing means 36 solves the equation:

$$\text{Output}=g_1(-D)+E$$

where D and E are input variables and $g_1$ is the adjustable gain of computing means 36. An instrument capable of solving the above equation is the conventional Foxboro M58-1 computing relay. Computing relay means 36 transmits a signal which in turn is received by computing relay means 30 as an input variable C. Lag means 34 transmits a pneumatic signal responsive to a signal received from controller 31 to computing relay means 30 as an input variable B.

A means for pneumatically providing a lag comprises a restriction means or restrictor such as a needle valve and a capacitance such as a tank. A single restrictor and capacitance in series constitutes a first order exponential lag whose time constant is equal to the resistance of the restriction means multiplied by the capacitance, where said resistance and capacitance are in consistent units. Measuring the pressure drop across the restriction means and dividing said pressure drop by the quantity of flow from said restriction means is a method whereby the value for the resistance is obtained. If another restrictor and capacitance are placed in series with the first restrictor and capacitance, a second order interacting exponential lag will result. For successive higher order interacting lags, a restrictor and capacitance are added in series through the previous lag unit. For successive high order non-interacting exponential lags, an isolation relay, restrictor and capacitor are added in series.

The function of lag means 33 and 34 must be such that a step change in the output signal transmitted by controller 31 will cause the output response of relay 30 to be equivalent to the process response exclusive of dead time. Lag means are provided in exponential response as herein illustrated. It is within the scope of this invention to provide other lag means for simulating any type process response exclusive of dead time. It is within the scope of the invention to eliminate lag means 34, passing an additional pneumatic pressure signal directly from lag means 33 as an input signal B to relay 30.

Of the compensating network, restriction means 37 and computing relay means 36 provide a means for pneumatically simulating the process dead time. As illustrated, restriction means 37 and computing relay means 36 are connected in such a manner as to provide a first order dead time approximation. It is within the scope of this invention to provide means of simulating higher order dead time in producing the compensating network.

As previously noted, lag means 34 can under specific circumstances be eliminated. This is generally done when higher dead time models are employed. It can be readily seen by those skilled in the art that lag means 33, 34, restriction means 37 and computing relay means 36 can be adjusted to fulfill the requirements set forth for the compensating network.

It can further be seen that the signal appearing at the output of computing relay means 36, which results from a step change in controller 31 output, will be exactly the same shape as the process response. A pneumatic signal appearing at the output of lag means 34 will be exactly equivalent to process response but without dead time.

Typical process conditions for the production of cis-1,4-polybutadiene in the above-describer two stage polymerization process are:

(1) 10,500 lbs./hr. of butadiene to reactor 11,
(2) 94,500 lbs./hr. of toluene to reactor 11,
(3) 64.79 lbs./hr. of triisobutylaluminum to reactor 11,
(4) 13.40 lbs./hr. of iodine to reactor 11,
(5) 4.98 lbs./hr. of titanium tetrachloride to reactor 11,
(6) a temperature of 45° F. maintained in reactor 11,
(7) a temperature of 70° F. maintained in reactor 18, and
(8) a conversion of 81.8 percent is obtained in the two-stage process.

In the described process, monomer conversion is regulated to a large degree by controlling the rate at which triisobutylaluminum is introduced into the system. It is usually necessary to employ an excess of this catalyst component in order to neutralize poisons which may be present in the feed materials. Because of heat transfer limitations in any practical reactor system, sufficient conversion must take place in the first reactor to permit temperature control to be maintained in the second reactor. Otherwise, an excess rate of conversion in the second reactor will result in an undesirably high temperature because the heat removal capacity of the second reactor may be exceeded. Conversion in the first reactor can be increased by increasing the concentration of triisobutylaluminum present in the reactors which depends upon its feed rate. However, a higher concentration generally causes a decrease in the total conversion through the system. In view of the fact that triisobutylaluminum is an expensive material and because it is desired to maintain a high total conversion, it is important to use the minimum amount of this component that is consistent with desired operating conditions and product quality.

In accordance with this invention, the control system adjusts the flow rate of triisobutylaluminum introduced into reactor 11 so that substantially all of the available heat removal capacity of the second reactor is used. This tends to increase the conversion in the first reactor and thereby produce a better distribution of conversion among the reactors. If the measured temperature of the second reactor tends to increase above the preselected set point value to controller 22, the control signal positions cooling valve 21 appropriately to regulate reactor temperature. This control signal also is applied through computer 24 and thereby functions to move valve 26 toward a more open position to increase the rate of addition of triisobutylaluminum, thus increasing conversion in reactor 11 markedly and somewhat decreasing conversion in reactor 18 thereby assuring controllability of its temperature. Conversely, a decrease in temperature in the second reactor tends to move valve 26 toward a more closed position. This type of reaction system is characterized by a substantially constant total conversion of butadiene to polymer in a reactor train but has the problem of a variable reaction dead time, believed due to catalyst induction or activation difficulties due in turn to trace quantities of catalyst poisons such as oxygen, water and others present in the butadiene and solvent feed streams. This inventive control system senses this process behavior through the medium of the cooling load required of coil 25 and valve 21 of reactor 18 to maintain its desired temperature, taking appropriate, dynamically compensated, cotrol action to cause an increase in the polymerization reaction achieved in reactor 11 when reactor 18 is experiencing cooling overload due to excessive reaction therein, and vice versa, manipulating triisobutylaluminum charge rate to adjust the degree of conversion among the several reactors. This method of manipulating the rate of triisobutylaluminum introduction is opposite to that which would normally be expected if each reactor were controlled independently. In such a system, the control action would be to decrease the rate of catalyst introduction to reduce the rate of reaction if a temperature increase were observed.

The invention has been described as applied to the production of cis-1,4-polybutadiene but it is not intended to be limited thereto. The control system of the invention can be used in other reaction control systems wherein a plurality of reactors are employed to conduct a catalytic, exothermic reaction where total conversion is substantially limited at a relatively high value. Examples of processes to which this system can be applied are butadiene or isoprene polymerizations initiated by catalyst systems such as cobalt or a variety of organometallic combinations, benzoic acid hydrogenation in caprolactam manufacture, and other solvent, slurry or emulsion polymerizations and copolymerizations of olefins or diolefins such as styrene, butadiene, acrylonitrile and aliphatic monoolefins.

As will be evident to those skilled in the art, various modifications of this invention can be made, or followed, in the light of the foregoing disclosure, without departing from the spirit or scope thereof.

What is claimed is:

1. In a multi-stage exothermic polymerization, process wherein butadiene and a catalyst including an alkyl aluminum as one component is introduced into a first reactor, and the effluent from the first reactor is passed through at least one second reactor; the method of control which comprises:

(a) measuring the temperature of material in the second reactor, comparing the measured temperature with a reference temperature value and establishing a control signal representative of the difference therebetween;

(b) adjusting the rate of heat removal from the second reactor in response to the control signal to tend to maintain the measured temperature equal to the reference temperature value;

(c) increasing the rate of addition of catalytic material to the first reactor in response to the control signal being indicative of the measured temperature being greater than the reference temperature value; and (d) decreasing the rate of addition of said alkyl aluminum to the first reactor in response to the control signal being indicative of the measured temperature being less than the reference temperature value.

2. The method of claim 1, further comprising measuring the temperature of material in the first reactor, comparing the measured temperature of material in the first reactor with a second reference temperature value and establishing a second control signal representative of the difference therebetween, and adjusting the rate of heat removal from the first reactor in response to said second control signal to tend to maintain the measured temperature of material in the first reactor equal to said second reference temperature value.

3. The method of claim 1 wherein steps (c) and (d) are performed in response to the control signal following a time delay which is representative of the process lag between the time of introduction of catalytic material and the measurement of a temperature change resulting therefrom in the second reactor.

4. The method of claim 1 wherein said component is triisobutylaluminum.

References Cited

UNITED STATES PATENTS 3,220,998 11/1965 Berger.
3,257,375 6/1966 Noorwood.

JOSEPH L. SCHOFER, Primary Examiner

W. F. HAMROCK, Assistant Examiner

U.S. Cl. X.R.

260—94.3, 95